(12) United States Patent
Fernandez et al.

(10) Patent No.: US 11,429,344 B1
(45) Date of Patent: Aug. 30, 2022

(54) LOCALLY GROUPING VOICE-ENABLED DEVICE STATE COMMUNICATIONS

(71) Applicant: Amazon Technologies, Inc., Seattle, WA (US)

(72) Inventors: Tomas Manuel Fernandez, Eagan, MN (US); Mark Lawrence, Bainbridge Island, WA (US); Charles James Torbert, Normandy Park, WA (US)

(73) Assignee: Amazon Technologies, Inc., Seattle, WA (US)

( * ) Notice: Subject to any disclaimer, the term of this patent is extended or adjusted under 35 U.S.C. 154(b) by 220 days.

(21) Appl. No.: 16/586,435

(22) Filed: Sep. 27, 2019

(51) Int. Cl.
| | |
|---|---|
| *G06F 3/16* | (2006.01) |
| *G10L 25/78* | (2013.01) |
| *H04L 12/28* | (2006.01) |
| *H04N 21/472* | (2011.01) |
| *G10L 15/22* | (2006.01) |

(52) U.S. Cl.
CPC .............. *G06F 3/167* (2013.01); *G10L 15/22* (2013.01); *G10L 25/78* (2013.01); *H04L 12/282* (2013.01); *H04N 21/47217* (2013.01); *G10L 2015/223* (2013.01)

(58) Field of Classification Search
CPC ......... G06F 3/167; G10L 15/22; G10L 25/78; G10L 25/223; H04L 12/282; H04N 21/47217
See application file for complete search history.

(56) References Cited

U.S. PATENT DOCUMENTS

| | | | | |
|---|---|---|---|---|
| 2016/0286607 | A1* | 9/2016 | Mishra | G06Q 50/265 |
| 2018/0146045 | A1* | 5/2018 | Kang | H04Q 9/00 |
| 2019/0295542 | A1* | 9/2019 | Huang | G10L 15/30 |
| 2020/0302925 | A1* | 9/2020 | Shah | G10L 15/22 |
| 2021/0204082 | A1* | 7/2021 | Soto | G10L 15/08 |

OTHER PUBLICATIONS

Igarashi "Using non-verbal voice input for interactive control" VAS-2001, Brown university (Year: 2001).*

* cited by examiner

*Primary Examiner* — Michelle M Koeth
*Assistant Examiner* — Darioush Agahi
(74) *Attorney, Agent, or Firm* — Eversheds Sutherland (US) LLP

(57) ABSTRACT

Devices, systems, and methods are provided for locally grouping voice-enabled device state communications. A device may determine first state information associated with the first device and send the first state information to a second device. The device may receive second state information associated with a second device and third state information associated with a third device. The device may receive an audible command, and may determine, based on the audible command, an indicator to send state data. The device may send the first state information, the second state information, the third state information, and data associated with the audible command. The device may receive fourth state information associated with the audible command.

20 Claims, 7 Drawing Sheets

US 11,429,344 B1

LOCALLY GROUPING VOICE-ENABLED DEVICE STATE COMMUNICATIONS

BACKGROUND

Media devices are interconnected more frequently and communicate in a variety of ways. Media device users may control multiple media devices using commands. However, when multiple devices may be controlled by commands from a user, it may be difficult to determine which device to which a command corresponds, and therefore which device should receive the command.

Figure 1:
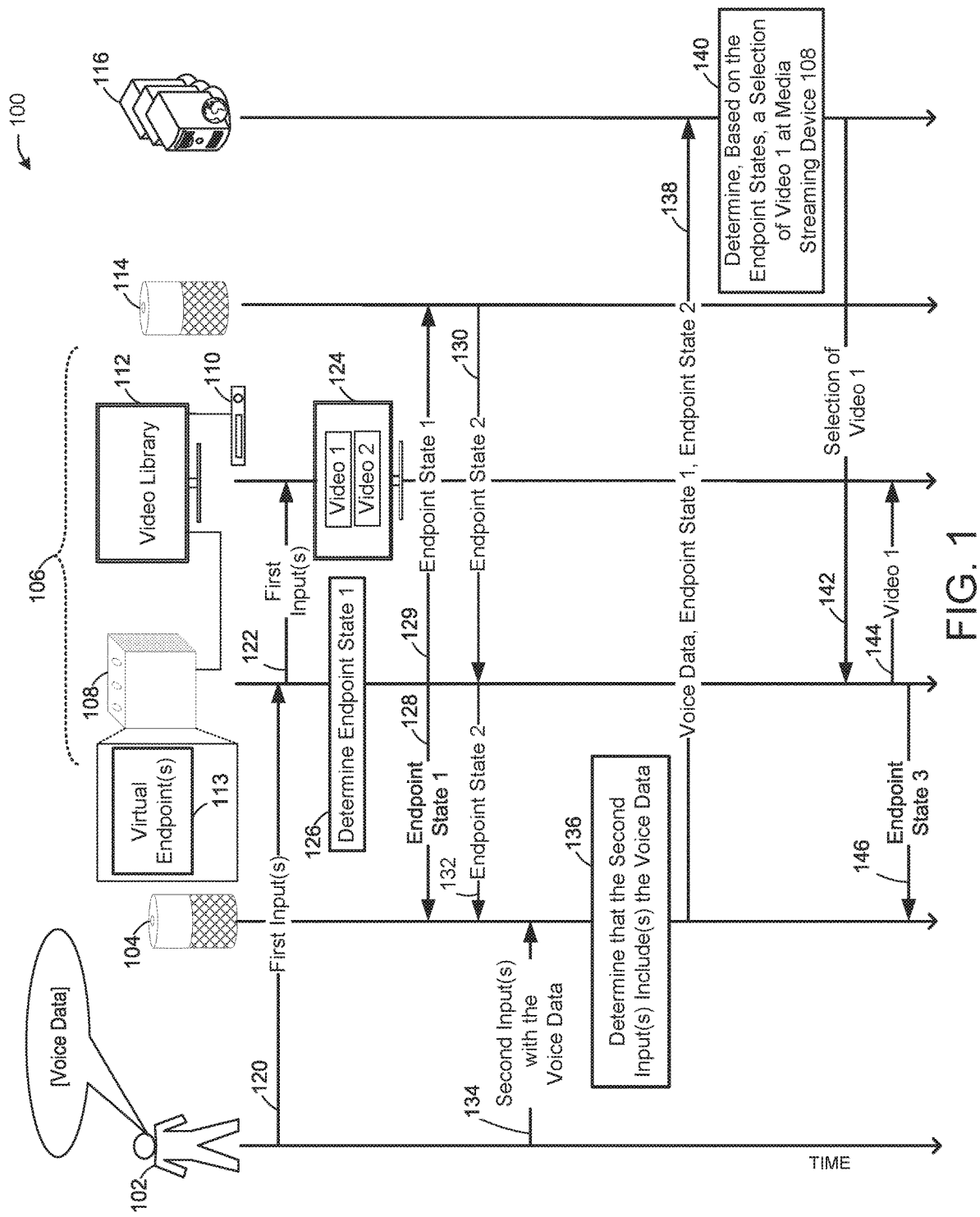
FIG. 1 illustrates an example process for locally grouping voice-enabled device state communications, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for locally grouping voice-enabled device state communications.

As media device users increasingly operate media devices of different types, and as media device systems may include multiple interconnected devices (e.g., televisions, receivers, media players, etc.), media device user may benefit from enhanced control of media devices. In particular, voice commands and some other types of commands (e.g., to select content to render, the control playback of content, the scroll or navigate selectable elements of a menu, etc.) may apply to any one or more media devices of a media device system. For example, when a user utters a voice command, such as, "Pause," "Select number four," "Scroll down," and the like, and multiple devices may receive commands controlling the rendering of content, a system may need to determine to which devices the voice command may apply (e.g., which device should the "pause" command apply). When multiple devices may provide presentable content, such as a streaming media device, a DVD player, a cable box, a game console, etc., which device is to receive a command to control playback, select content to play, and the like may be based on the state of given devices at the time.

Devices may use user interface controllers or other controllers to manage the content displayed or otherwise presented. For example, a television may include a user interface controller which monitors the state of the television (e.g., a user interface state) and the state of device components and/or applications executing on the device. For example, a device may have multiple audio rendering components, multiple video rendering components, and multiple user interface controller components, and the different components may not be aware of one another. The components and/or applications may communicate their respective states to one or more services of a device, but not necessarily to one another. Each component or application may be considered an endpoint, thus a state may be an endpoint state.

A state may be indicative of a user interface and which content (e.g., selectable elements corresponding to menu items, selectable content to render, etc.) is displayed at a given time. States may be indicative of content that is playing, content that is displayed, and the like. In a given endpoint state, a user interface controller or other controller may determine which actions to take given a corresponding command or input. For example, when a remote control device "scroll right" input is received, the corresponding action may be determined based on the interface and content shown at the time. When the endpoint state information indicates that a menu or content library is shown, a scroll right input may correspond to moving a cursor from a current selectable item to a selectable item to the right of the current selectable item. When the current selectable item is the right-most item, for example, the cursor may wrap around to the first (e.g., left-most) selectable item, or the selectable items may move one position to the left (e.g., so that the left-most selectable item is replaced by the item immediately to the right of the left-most item, and so on), and the right-most selectable item may be replaced by a new selectable item that was not previously shown on the interface. When a user command is a selection of an "Enter," "Select," or "OK" button on a remote control device, for example, the content selected may be content displayed and highlighted or otherwise indicated. To determine actions corresponding to the selection of an "Enter," "Select," or "OK" button, the user interface controller or other controller may determine, based on the user interface and which content is presented for selection, an action to select particular content (e.g., a movie, television show, etc.) based on an identifier of the selectable content.

When endpoint media devices may be controlled by voice commands, the determination of which media and/or endpoint device is to be controlled by a received voice command may be based on the state of multiple media devices and/or endpoints. In particular, given respective endpoint states of multiple media devices and/or endpoints, the endpoint state most likely to correspond to a voice command may indicate that the media device and/or endpoint in the endpoint state most likely to correspond to the voice command is the media device for which commands are intended by the voice command. Therefore, media devices and/or endpoints may provide endpoint states to one or more other media devices, endpoints, and/or to remote networks (e.g., cloud-based networks) to be used in determinations of commands to issue to particular devices and/or endpoints when a voice command or other type of command is received.

In a remote network-based analysis of voice and other commands, media device and/or endpoint state information may be communicated by many devices whenever an endpoint's state information changes, and/or may be communicated periodically. When multiple media devices and/or endpoints are communicating endpoint state information to a remote network, and when the remote network may analyze the endpoint state information to determine to which media device and/or endpoint a voice or other command applies, the processes of receiving and processing the endpoint state information may be expensive from a processing perspective by the remote network, and the remote network may not be able to estimate some of the large amounts of endpoint state information updates (e.g., received state information may not be available for analysis by the remote network when analyzing a voice or other command).

Therefore, devices and systems may benefit from reducing the number and frequency of endpoint state information update communications by using coordination between devices and/or endpoints.

In one or more embodiments, media devices, such as voice-enabled media devices (e.g., devices capable of receiving and/or responding to voice commands) may coordinate by sharing their endpoint state information locally (e.g., with media devices connected to a local area network in a home, office, building, etc.). By designating one or more multiple media devices as a "main device" or "reporter device," for example, media devices may provide their endpoint state information to a main device or reporter device, which may aggregate media device state information from multiple devices, including the main device or reporter device, and may provide the aggregated endpoint state information of multiple devices to the multiple devices so that the multiple devices may be aware of the endpoint state information of other media devices. By maintaining endpoint state information locally among multiple devices rather than each media device providing its respective endpoint state information to a remote network, the number of transmissions from a local network to a remote network, and the number of endpoint state updates provided to the remote network, may be reduced.

In one or more embodiments, to reduce the number of transmissions of endpoint state information to a remote network, the communication of endpoint state information to the remote network may be limited to particular trigger actions (e.g., indicators that endpoint state information is to be sent to the remote network). For example, certain types of commands, such as voice commands, may be sent to the remote network for translation (e.g., to determine the intent of the voice command, and to determine instructions that result in commands which cause devices and/or endpoints to perform actions based on the intent). When a voice command is received by a media device, because the voice command may be sent to the remote network for translation, the media device may send endpoint state information along with any data associated with the voice command (e.g., voice data representing the voice utterance of the voice command) to the remote network so that the remote network may analyze the endpoint state information when determining which media device is to receive commands in response to the voice command. Other types of commands may trigger sending the endpoint state information along with command data to the remote network for analysis, such as commands related to the selection of content to render, playback control actions (e.g., pause, play, stop, fast forward, rewind, skip back, etc.), menu display/navigation commands (e.g., scroll up, scroll down, scroll left, scroll right, etc.), and the like. When such a command is identified, a media device may provide endpoint state information to the remote network. When commands which do not trigger sending endpoint state information to the remote network are identified (e.g., when an indicator to send endpoint state information to the remote network are absent in a command), a media device may process the command and send updated state information to one or more media devices without sending the endpoint state information to a designated endpoint in the remote network.

In one or more embodiments, endpoint state information may include cloud-controlled states and endpoint-controlled states, and endpoint states may be programmatic (e.g., automatic state changes caused by an endpoint) or manual (e.g., caused by a user action). A cloud-controlled state may refer to an endpoint over which a remote network is the authority. An endpoint-controlled state may be a state on an endpoint over which the endpoint is the authority. Some endpoint states may change rapidly, such as a result of changes in a user interface, a current playback position of media content, and the like, and reporting and processing the reporting of such rapidly changing endpoint states may be a resource-expensive process. An endpoint, such as a media device, application, or component of a media device, may share its endpoint state (e.g., states lacking the trigger to provide media device state information to a remote network) to other endpoints in a local network. An endpoint may indicate to a remote network a request to emit an endpoint state (e.g., rapidly changing media device state information). The remote network may determine the addresses (e.g., medium access control addresses, uniform resource locations, etc.) of the local network endpoints to which the endpoint should report the endpoint state. For example, a local network may include multiple endpoints.

In one or more embodiments, when a new endpoint is initiated (e.g., booted), the new endpoint may communicate with a state service, which can be in a same local network or in a remote network, to provide endpoint state information, and to receive instructions indicating which endpoints to which the new endpoint may provide media device state information. A network may query endpoints in a same space (e.g., a local area network with the same Internet protocol address as the new endpoint), and may store any provided endpoint state information for the new endpoint. The network may identify any endpoints in the same space, and may identify which of the endpoints is a master or main endpoint (e.g., a media device state information reporter), and the network may provide such information (e.g., endpoint addresses) to the endpoints in the space (e.g., including providing the new endpoint address to the existing endpoints in the space, and providing the existing endpoint addresses of the space to the new endpoint). In this manner, the endpoints may be instructed regarding where to send endpoint state information within a local network. When an endpoint has been established and may communicate with a remote network, the network may instruct the endpoint where (e.g., IP addresses, URLs, etc.) when (e.g., when a user interface state changes, time increments, when a particular type of event occurs, etc.), and how (e.g., which protocol, which type of encryption) to communicate endpoint state information. The location to which an endpoint sends endpoint state information may be a master endpoint designated to report endpoint state information of one or more devices when a condition is met, or may be any endpoint, including endpoints in a local area network, mesh network, or a remote network (e.g., endpoints sharing endpoint state information do not need to be connected in a local network topology). For example, a video or music streaming application functioning as an endpoint on a media device may send its endpoint state information to another media device on a local network, and/or may send its endpoint state information to a remote network. The device or system that determines the endpoints with which any endpoint is to communicate state information may query endpoints in a space, and/or may use any information, algorithm, or strategy to identify endpoints whose state information another endpoint may be instructed to use. In this manner, endpoints that communicate their respective states to one another may not all be in the same local network.

In one or more embodiments, a master endpoint or endpoint reporter may determine when an endpoint state has changed at the master endpoint or at another endpoint (e.g., an endpoint receiver), as the endpoint receivers may provide their state information to the master endpoint. When an endpoint state has changed, or after a time threshold has been exceeded, the master endpoint may provide a context report to the endpoint receivers. The context report may include endpoint state information of the endpoint receivers and/or master endpoints in the local network. When a state reporting instruction is received and includes an indicator that endpoint state information may be sent to a remote network, the endpoint which receives the state reporting instruction may provide the endpoint state information along with data (e.g., voice data of a received voice utterance) to the remote network and/or to any endpoint. When the remote network determines that the data (e.g., an utterance or input received from a user) is intended to control the endpoint which provided the endpoint state information, the remote network may send instructions to that endpoint or to a master endpoint to instruct the relevant endpoint. When the remote network determines that an utterance or other input is intended to control a different endpoint than the endpoint which provided the endpoint state information, the remote network may send instructions to the different endpoint that is to be controlled by the utterance or input. In some embodiments, the designated (e.g., master) endpoints may be in a local network or may be in a remote network. In this manner, devices in a mesh network may be primed to send state information for any number of endpoints to a remote network to allow the remote network to consider the state information of multiple endpoints when analyzing an event or request.

In one or more embodiments, a trigger to cause an endpoint to send endpoint state information to a remote network may include a voice utterance (e.g., a wake word and/or string of audio), a geo-location (e.g., a command determined to be from within a distance threshold of a device, based on voice intensity, for example), an audible command/input such as a doorbell, a wireless signal from a smart home or Internet of things (IOT) device, and the like. For example, a smart home device may control an IOT device network, such as a network of temperature controllers, lightbulbs, doorbell cameras, microwaves, refrigerators, and the like. The smart home device may maintain device state information such as whether lights are on or off, at what power/intensity level, a temperature of a thermostat, microwave, or refrigerator, a security alarm status (e.g., active, not active, etc.), and the like. An endpoint may receive endpoint information from a smart home device, and the smart home device may be an endpoint capable of communicating with a remote network. Endpoint state information of IOT and other devices may be used to translate commands, such as "Turn on the lights," "Set the temperature to 72 degrees," and the like.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 illustrates an example process 100 for locally grouping voice-enabled device state communications, in accordance with one or more example embodiments of the present disclosure.

Referring to FIG. 1, the process 100 may include a user 102, a media device 104 (e.g., endpoint), a media device system 106, which may include a streaming media device 108, a cable box 110, a display 112 (e.g., television), and one or more other devices (e.g., game consoles, DVD and/or Blu-ray players, and the like, not shown), one or more virtual endpoints 113 (e.g., a virtual endpoint such as a media application executing on the streaming media device 108 or any other device), a media device 114, and one or more remote servers 116 (e.g., cloud-based severs). At step 120, the user 102 may send one or more first inputs to an endpoint, such as the streaming media device 108. The one or more first inputs may be made manually and/or with a remote control device (not shown), and may include commands to power on the streaming media device 108, to activate one or more menus or other interfaces, and the like. At step 122, the streaming media device 108 may send the one or more first inputs to the display 112 (e.g., wirelessly or through an input port such as HDMI, RCA, component, etc.). For example, the one or more first inputs may include a command to activate the streaming media device 108 (and/or the one or more virtual endpoints 113), which may result in presentation of a video library showing available content provided by the streaming media device 108. At step 124, the display 112 may present a first interface, such as an interface showing selectable video content for presentation (e.g., using a selectable element for Video 1 and a selectable element for Video 2). At step 126, the streaming media device 108 may determine a first endpoint state (e.g., endpoint state 1), which may represent media device endpoint information indicating that the interface showing selectable video content for presentation is being presented (e.g., that the one or more virtual endpoints 113 are presenting the interface), and that Video 1 and Video 2 are selectable elements. At step 128, the streaming media device 108 may send the endpoint state information (e.g., endpoint state 1) to another endpoint, such as a master endpoint (e.g., media device 104). At step 129, the streaming media device 108 may send the endpoint state information (e.g., endpoint state 1) to any other endpoints, such as the media device 114. In this manner, multiple devices may have the endpoint state 1 so that when any respective device receives a command or detects an event triggering a communication with the one or more remote servers 116, the device may send collected endpoint state information of its endpoints and of any endpoints of other devices. At step 130, the media device 114 may send second endpoint state information (e.g., endpoint state 2, indicative of the endpoint state of the media device 114) to the streaming media device 108, and at step 132, may send the endpoint state 2 to the media device 104. Endpoint state 2 and any other endpoint state of a media device may be triggered based on a manual action (e.g., the first commands of step 120) and/or programmatically (e.g., based on an automatic action taken by an endpoint, such as a change in display or other rendered content, a change in power state, etc.).

Still referring to FIG. 1, at step 134, the media device 104 may receive one or more second inputs including voice data (e.g., from a voice utterance provided by the user 102). At step 136, the media device 104 may determine that the one or more second inputs include the voice data (e.g., which may be an indicator to send device state data, such as the endpoint state information, to the one or more remote servers 116). At step 138, the media device 104 may send the first endpoint state information, the second endpoint state information, and the voice data to the one or more remote servers 116 (e.g., because the media device 104 is aware of the endpoint state 1 and the endpoint state 2). At step 140, the one or more remote servers 116 may determine, based on the first endpoint state information, the second endpoint state information, and the voice data, that the voice data is indicative of a selection of Video 1 using the streaming media device 108 (e.g., or more specifically, using the one or more virtual endpoints 113). At step 142, the one or more remote servers 116 may send, to the streaming media device 108 and/or other endpoints, one or more instructions indicating that the voice data is associated with the streaming media device 108 (or the one or more virtual endpoints 113) selecting Video 1 for playback. At step 144, the streaming media device 108 may send one or more commands to the display 112 to cause playback of Video 1 at the display 112. At step 146, when Video 1 is being rendered, the endpoint state 1 of the streaming media device 108 may be updated to reflect the user interface indicative of playback of Video 1 (e.g., endpoint state 3), and the streaming media device 108 may send third endpoint state information (e.g., endpoint state 3) to the media device 104 to update the media device 104.

While the media device 104 is shown as the master endpoint in FIG. 1, any endpoint may be the master endpoint and may collect state information from other endpoints. Alternatively, no endpoints may be master endpoints, and a propagation method may be used in which any endpoints may communicate endpoint state information to any other endpoint and/or to the one or more remote servers 116. The media device 104, the media device system 106, and the media device 114 may be connected via one or more local networks (e.g., may share a basic service set through one or more access points, not shown). The master endpoint (e.g., the media device 104 as shown in FIG. 1) may receive endpoint state information from any endpoint on the local network, and may provide the endpoint state information of the other endpoints along with the endpoint state information of the master endpoint to the other endpoints. Any endpoint may receive a command from the user 102 and may send the endpoint state information to the one or more remote servers 116 when a trigger is identified. The one or more remote servers 116 may provide instructions (e.g., step 142) to any endpoint, including the endpoint for which the instructions are intended, and/or to the designated master endpoint (e.g., in which case a master endpoint may instruct the relevant endpoint with one or more commands).

In one or more embodiments, the media device 104, any device of the media device system 106, the media device 114, and/or the one or more remote servers 116 may include a personal computer (PC), a smart home device, a device with one or more speakers or other audio outputs, a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a Blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list. The one or more remote servers 116 may include a remote network (e.g., a cloud-based computer network of one or more physical or virtual computers), and may be accessible by the media device 104, any devices of the media device system 106, and/or the media device 114 (e.g., to provide commands and related data, to provide media device state information, and/or to receive instructions which correspond to commands to control devices).

Figure 2:
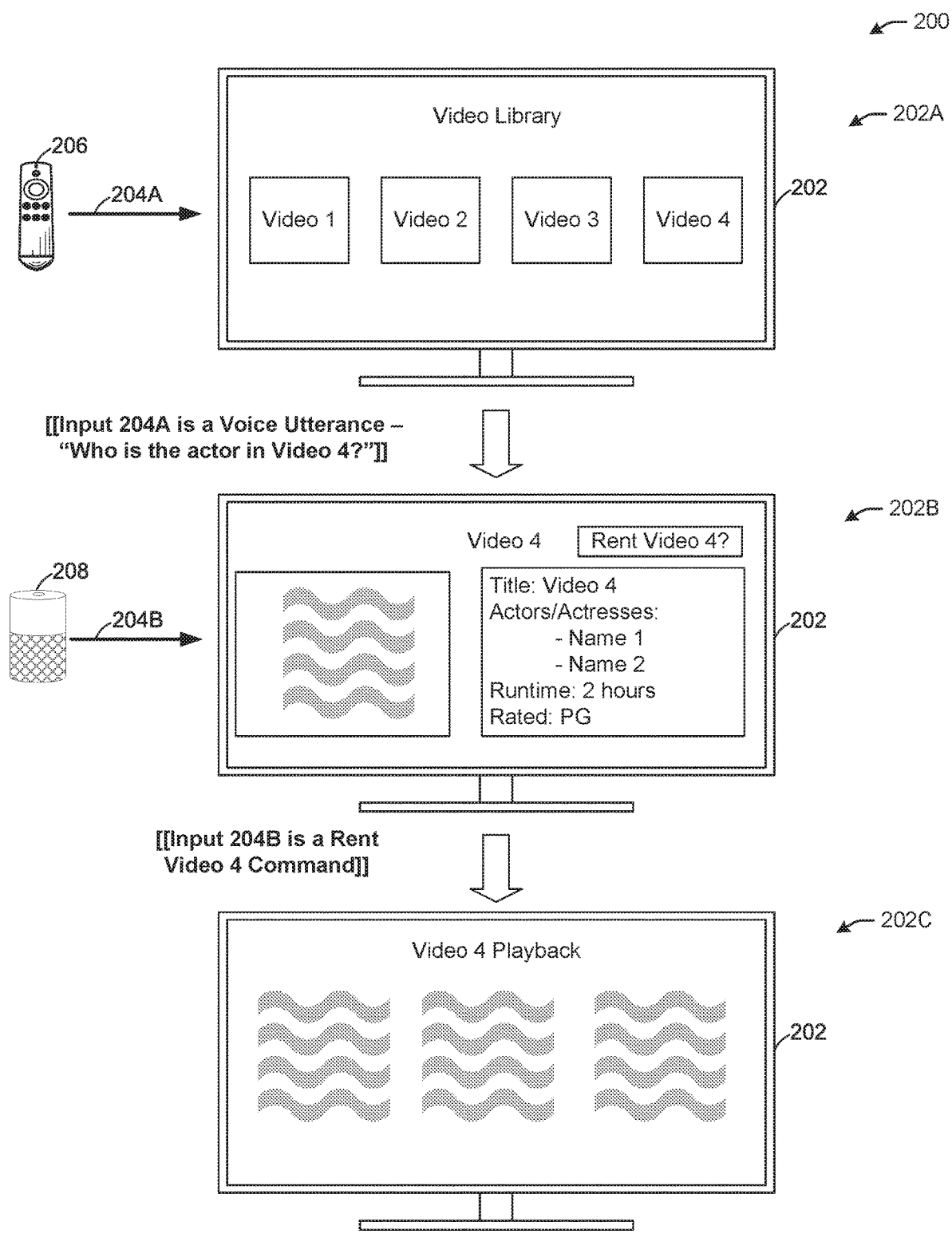
FIG. 2 illustrates a process for locally grouping voice-enabled device state communications, in accordance with one or more example embodiments of the present disclosure.

FIG. 2 illustrates a process 200 for locally grouping voice-enabled device state communications, in accordance with one or more example embodiments of the present disclosure.

Referring to FIG. 2A, the process 200 may include a display 202 (e.g., having functionality similar to the display 112 of FIG. 1). In FIG. 2, the display 202 may receive one or more first inputs 204A (e.g., similar to step 120 of FIG. 1) from a remote control device 206 (e.g., a button push, touch pad touch, or other gesture detected by the remote control device 206, or a voice utterance detected by the remote control device 206). The one or more first inputs 204A may include wireless commands such as infrared commands, laser commands, Wi-Fi signals, Bluetooth signals, ultrasound signals, and the like. The display 202 may be in device state 202A, in which the display 202 may render a video library with selectable elements for Video 1, Video 2, Video 3, and Video 4 (e.g., different video titles, which, when selected, result in playback at the display 202). In FIG. 2, the one or more first inputs 204 may include a voice utterance (e.g., a question such as "Who is the actor in Video 4?"). When the voice data of the voice utterance is sent to the one or more remote servers 116 of FIG. 1 for analysis (e.g., similar to step 138 of FIG. 1), the one or more remote servers 116 may not be able to determine what Video 4 is, where Video 4 is being displayed, and to which endpoint to provide instructions resulting in the presentation of the answer to the question "Who is the actor in Video 4?" without being aware of endpoint state information. Based on the endpoint state 202A, the display 202 or another device (e.g., the streaming media device 108 of FIG. 1) may determine a second endpoint state (e.g., endpoint state 202B), in which information about Video 4 is displayed, such as the title, actors/actresses, a runtime, a rating, images or sample content (e.g., video clips), and an option to rent or buy Video 4, along with other possible displayable information. Similar to step 140 of FIG. 1, the one or more remote servers 116 of FIG. 1 may determine, based on the endpoint state 202A and the voice data of the one or more first inputs 204A, that the display 202 (or a virtual endpoint of the display 202, such as a video streaming application) is responsible for presenting Video 4, and may send instructions (e.g., similar to step 142 of FIG. 1) to direct the display 202 (or the specific virtual endpoint of the display 202) to present the Video 4 information according to the endpoint state 202B.

Still referring to FIG. 2, the display 202 may receive one or more second inputs 204B from the same or another device (e.g., a media device 208 similar to the media device 104 and the media device 114 of FIG. 1). The one or more second inputs may include a selection command as shown in FIG. 2 (e.g., an input indicating a request to rent Video 4, which may be in the form of a voice utterance or physical input, such as a button push or touch). Based on the endpoint state 202B, the display 202 may determine that a content selection command (e.g., an "OK," "Select," "Enter," voice uttered "Rent Video 4" input, etc.) command may correspond to an action to select and present Video 4 at the display 202. Alternatively, the display 202 may send endpoint state 202B to the one or more remote servers 116 of FIG. 1, which may determine that the one or more second inputs 204B include a request to rent Video 4, and may send instructions to the display 202 (e.g., as in step 142 of FIG. 1) to cause the display 202 to render Video 4. When Video 4 is being rendered, the display 202 may use a third endpoint state (e.g., endpoint state 202C), and the third endpoint state may be used to determine actions associated based on any subsequent commands (e.g., a pause or stop input received while the display 202 is in the endpoint state 202C).

In one or more embodiments, the display 202, the remote control device 206, and/or the media device 208 may determine the endpoint states (e.g., the endpoint state 202A, the endpoint state 202B, the endpoint state 202C) as endpoint state information that may be used by the devices to determine actions corresponding to commands or other inputs received from a user (e.g., the user 102 of FIG. 1). The display 202, the remote control device 206, and/or the media device 208 may send the one or more first inputs 204A and/or the one or more second inputs 204B (or associated data, such as voice utterance data) to a remote network (e.g., the one or more remote servers 116 of FIG. 1) for translation. For example, when an input includes a voice command or other audible command, the endpoint state information for the display 202 may be sent to the remote network for analysis. The display 202, the remote control device 206, and/or the media device 208 may have endpoint state information for any of the other devices and may provide the endpoint state information to the remote network.

While FIG. 2 shows some types of commands and endpoint states, other commands and endpoint states may be used. For example, commands may include requests to control any type of device, such as to turn a device on or off, to adjust volume, to adjust brightness, to adjust temperature, to start a process, to end a process, to select and/or play content, to join a game or activity, to download content, to respond to a question, and the like. Endpoint information may indicate whether devices are on or off, which interface and/or content is being displayed, a point in time in of presentable content (e.g., the content being played is at a particular time, frame, page, or the like), the temperature, whether the device is on or off, to activate or deactivate a virtual endpoint, to control a virtual endpoint, to download or delete a virtual endpoint, and the like.

Figure 3:
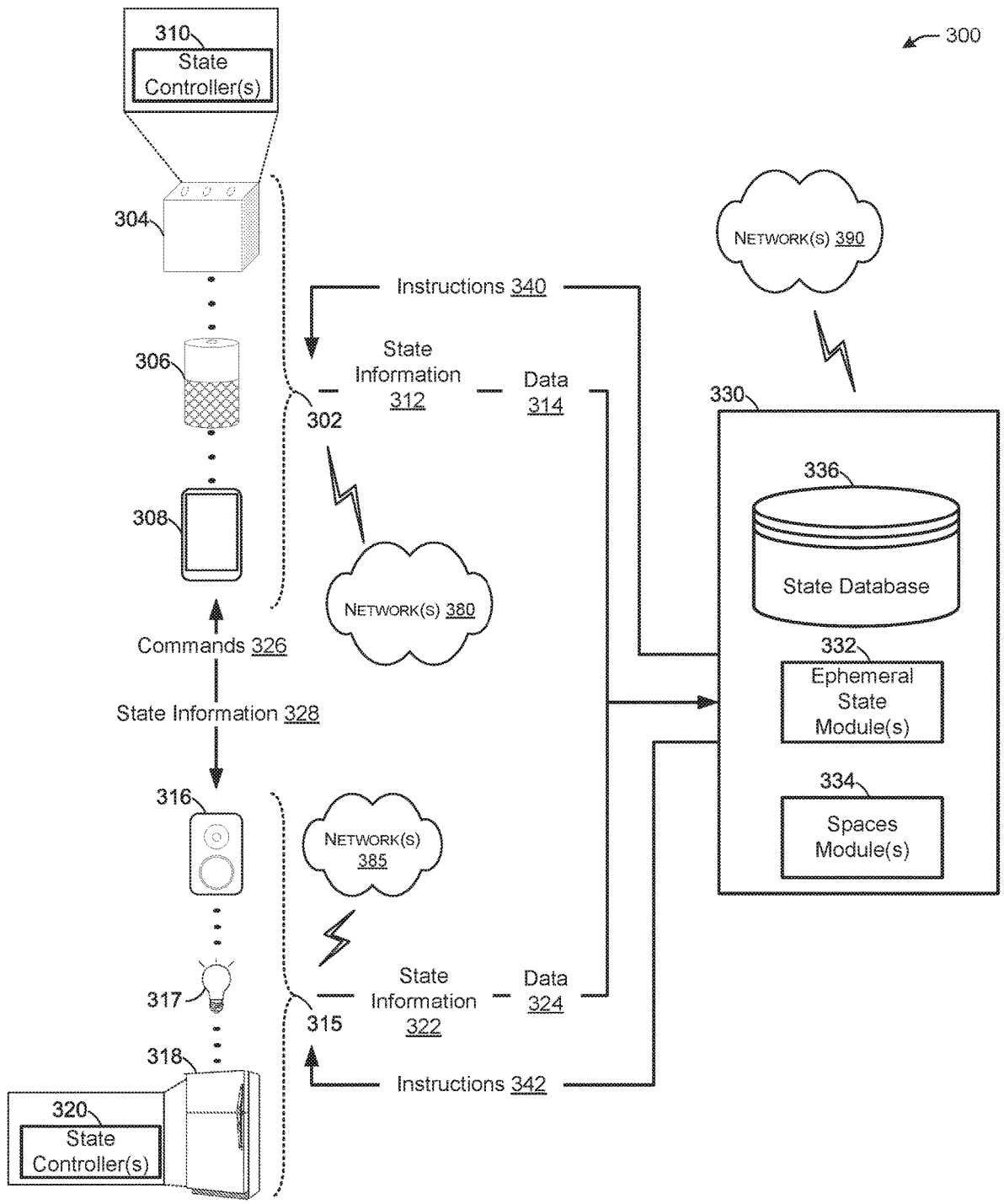
FIG. 3 illustrates a system for locally grouping voice-enabled device state communications, in accordance with one or more example embodiments of the present disclosure.

FIG. 3 illustrates a system 300 for locally grouping voice-enabled device state communications, in accordance with one or more example embodiments of the present disclosure.

Referring to FIG. 3, the system 300 may include one or more media devices 302 (e.g., device 304, device 306, device 308, having similar features to the media device 104 of FIG. 1, the devices of the media device system 106 of FIG. 1, the media device 114 of FIG. 1), any of which may determine endpoint state information using a state controller 310. The state controller 310 may determine endpoint state information 312 (e.g., the endpoint state 1 of FIG. 1, the endpoint state 2 of FIG. 1, the endpoint state 3 of FIG. 3, the endpoint state 202A of FIG. 2, the endpoint state 202B of FIG. 2, the endpoint state 202C of FIG. 3), and the one or more media devices 302 may communicate the state information 312 and data 314 (e.g., data associated with received commands, such as voice data) as explained further below. The one or more media devices 302 may communicate with one or more IOT devices 315 (e.g., IOT device 316, IOT device 317, IOT device 318), which may share one or more local networks with the one or more media devices 302, and any of the one or more IOT devices 315 may include a state controller 320. The state controller 310 and the state controller 320 may facilitate the presentation of content on respective devices using objects, selectable elements, images, text, and the like. The state controller 320 may determine state information 322 (e.g., the endpoint state 1 of FIG. 1, the endpoint state 2 of FIG. 1, the endpoint state 3 of FIG. 3, the endpoint state 202A of FIG. 2, the endpoint state 202B of FIG. 2, the endpoint state 202C of FIG. 3), and the one or more IOT devices 315 may communicate the state information 322 and data 324 (e.g., data associated with received commands, such as voice data) as explained further below. The one or more media devices 302 and/or the one or more IOT devices 315 may be endpoints, any of which may be master endpoints. The one or more media devices 302 and the one or more IOT devices 315 may communicate commands 326 (e.g., voice commands or other audio commands, wireless signals that cause devices to activate, deactivate, adjust settings, select and play content, scroll inputs, generate menus, and the like) and state information 328 (e.g., one endpoint may provide its state information and state information for any other endpoint to one or more endpoints). The state information 328 may include state reporting instructions that cause an endpoint to send endpoint state information to a remote network 330. For example, when a condition is met, such as when a voice utterance is received, the state information 328 may include endpoint state information, a request to send the endpoint state information, and any relevant data (e.g., voice utterance data) to provide to the remote network 330 (e.g., similar to step 138 of FIG. 1).

Still referring to FIG. 3, the system 300 may include the remote network 330 (e.g., similar to the one or more remote servers 116 of FIG. 1). The remote network 330 may be a cloud-based network with accessible computer resources available to the one or more media devices 302 and the one or more IOT devices 315. For example, the remote network 330 may have one or more ephemeral state modules 332, one or more spaces modules 334, and a state database 336. The remote network 330 may store endpoint state information (e.g., the state information 312, the state information 322), including media device addresses (e.g., IP addresses, medium access control addresses URLs, etc.), indications of which endpoints are master endpoints for a local network or account, and the like. To avoid every state update being stored by the state database 336 (e.g., frequent updates to the state information maintained by the state database 336), the state information 312 and the state information 322 may be provided in limited circumstances, such as when an indicator (e.g., the presence of voice data) triggers sending the state information 312 and the state information 322 to the remote network 330. The one or more ephemeral state modules 332 may send instructions 340 to the one or more media devices, and may send one or more instructions 342 to the one or more IOT devices 316. The instructions 340 and the instructions 342 may indicate the addresses of endpoints (e.g., URLs, medium access control addresses, etc.), including which endpoints are master endpoints, to which to send the state information 328, and the indicators to use as triggers to determine when to send the state information 312 and the state information 322 to the remote network 330 (e.g., the remote network 330 may communicate the criteria with which endpoints may determine to send the state information 312 and the state information 322 to the remote network 330). The instructions 340 and the instructions 342 may include instructions that correspond to the data 314 and the data 324 (e.g., translations of inputs, such as the one or more first inputs of step 120 of FIG. 1, and the one or more second inputs of step 134 of FIG. 1, that may be received by the one or more media devices 302 and/or the one or more IOT devices 315), and which may be based on the state information 312 and/or the state information 322. For example, the instructions 340 and the instructions 342 may include instructions to communicate to one or more endpoints which commands the one or more endpoints may execute or send to cause actions based on the data 314 and/or the data 324 (e.g., when an endpoint receives a voice command or other audible command indicating a request to scroll in a direction of a menu or content library, a request to select and play content, a request to control the state of the one or more IOT devices 315, a request to control playback of content, and the like). For example, device 304 may send user interface data and/or video content to a display (e.g., the display 112 of FIG. 1) based on the instructions 340, which may indicate that the device 304 has been instructed to play content (e.g., Video 1 of FIG. 1, Video 4 of FIG. 2).

In one or more embodiments, any of the one or more media devices 302 and/or the one or more IOT devices 315 may be a master endpoint or any type of endpoint which may receive the state information 328 (e.g., the state information 328 may include state information of the one or more media devices 302 and/or the one or more IOT devices 315), and may send the state information 328 to any of the one or more media devices 302 and/or the one or more IOT devices 315. An endpoint that is not a master endpoint may receive the state information 328 from a master endpoint and may provide its own state information to the master endpoint and/or to the remote network 330.

In one or more embodiments, to reduce the number of transmissions of the state information 312 and/or the state information 322 to the remote network 330, the communication of the state information 312 and/or the state information 322 to the remote network 330 may be limited to particular trigger actions. For example, certain types of commands, such as voice commands, may be sent to the remote network 330 for translation (e.g., the data 314 and/or the data 324 may include voice data from a voice utterance received by the one or more media devices 302 and/or the one or more IOT devices 315). When a voice utterance is received by the one or more media devices 302 and/or the one or more IOT devices 315, because the voice utterance may be sent to the remote network 330 for translation, the one or more media devices 302 and/or the one or more IOT devices 315 may send the state information 312 along with the data 314 or may send the state information 322 along with the data 324 to the remote network 330 so that the remote network 330 may analyze the state information 312 and/or the state information 322 when determining which endpoint is to receive instructions in response to the voice utterance. Other types of inputs or conditions (e.g., manual or programmatic state changes) may trigger sending the state information 312 along with the data 314 or sending the state information 322 along with the data 324 to the remote network 330 for analysis, such as inputs related to the selection of content to render, playback control actions (e.g., pause, play, stop, fast forward, rewind, skip back, etc.), menu display/navigation commands (e.g., scroll up, scroll down, scroll left, scroll right, etc.), virtual endpoint controls, and the like. When such an input is identified, an endpoint may provide state information 312 and/or the state information 322 to the remote network 330. When inputs or state changes which do not trigger sending the state information 312 and/or the state information 322 to the remote network 330 are identified, and endpoint may process the command and send the state information 328 to one or more endpoints without sending the state information 312 and/or the state information 322 to a designated endpoint (e.g., the one or more ephemeral state modules 332) in the remote network 330.

In one or more embodiments, a master endpoint or endpoint reporter may determine when a media device state has changed at the master endpoint or at another endpoint (e.g., an endpoint receiver) as the endpoint receivers may provide the state information 328 to the master endpoint. When an endpoint state has changed, or after a time threshold has been exceeded, the master endpoint may provide the state information 328 of the endpoint receivers and/or virtual endpoints and master endpoints in the local network. When a command is received and includes an indicator that the state information 312 and/or the state information 322 may be sent to the remote network 330, the endpoint which receives the command may provide the state information 312 and/or the state information 322 along with the data 314 and the data 324 to the remote network 330. When the remote network 330 determines that an input is intended to control the endpoint which provided the state information 312 and/or the state information 322, the remote network 330 may send the instructions 340 and/or the instructions 342 to that endpoint or to a master endpoint to instruct the relevant endpoint. When the remote network determines that an input is intended to control a different endpoint than the endpoint which provided the state information 312 and/or the state information 322, the remote network 330 may send the instructions 340 and/or the instructions 342 to the different endpoint that is to be controlled by the command, or may send the instructions 340 and/or the instructions 342 to a designated endpoint (e.g., a master endpoint) to provide the commands 326 to the relevant endpoint. In some embodiments, the designated (e.g., master) endpoints may be in a local network or may be in the remote network 330.

In one or more embodiments, a trigger to cause an endpoint to send the state information 312 and/or the state information 322 to the remote network 330 may include a voice utterance (e.g., a wake word and/or string of audio), a geo-location (e.g., a command determined to be from within a distance threshold of a device, based on voice intensity, for example), an audible command such as a doorbell (e.g., the IOT device 316), a wireless signal from the one or more Internet of things (IOT) devices 315, and the like. For example, the one or more media devices 302 may control the one or more IOT devices 315, such as a network of temperature controllers, lightbulbs (e.g., the IOT device 317), doorbell cameras (e.g., the IOT device 316), microwaves, refrigerators (e.g., the IOT device 318), and the like. The one or more media devices 302 may maintain the state information 328 such as whether lights are on or off, at what power/intensity level, a temperature of a thermostat, microwave, or refrigerator, a security alarm status (e.g., active, not active, etc.), and the like. An endpoint may receive the state information 328 from the one or more media devices 302, and one or more media devices 302 may be an endpoint capable of communicating with the remote network 330. The state information 328 of the one or more IOT devices 315 may be used to translate commands, such as "Turn on the lights," "Set the temperature to 68 degrees," "Set the microwave to cook for one minute," "Show me the doorbell video feed," and the like.

The one or more media devices 302 may be configured to communicate via a communications network 380, the one or more IOT devices 315 may be configured to communicate via a wireless communications network 385, and the remote network 330 may be configured to communicate via a wireless communications network 390 wirelessly or wired (e.g., the same or different wireless communications networks used to provide access between the one or more media devices 302, the one or more IOT devices 315 and respectively connected devices, and the remote network 330, such as for a cloud-based network). The communications network 380, the communications network 385, and/or the communications network 390 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, the communications network 380, the communications network 385, and/or the communications network 390 may have any suitable communication range associated therewith and may include, for example, global networks (e.g., the Internet), metropolitan area networks (MANs), wide area networks (WANs), local area networks (LANs), or personal area networks (PANs). In addition, communications network 380, the communications network 385, and/or the communications network 390 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof. The communications network 380 and the communications network 385 may include one or more local networks shared by the one or more media devices 302 and the one or more IOT devices 315 (e.g., one or more service sets to which the one or more media devices 302 and the one or more IOT devices 315 may connect), and the communications network 380 and the communications network 385 may facilitate communications with the remote network 330.

The one or more media devices 304, the one or more IOT devices 315, and/or the remote network 330 may include any suitable processor-driven device including, but not limited to, a mobile device or a non-mobile, e.g., a static, device. For example, the one or more media devices 304, the one or more IOT devices 315, and/or the remote network 330 may include, a user equipment (UE), a station (STA), an access point (AP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. It is understood that the above is a list of devices. However, other devices, including smart devices, Internet of Things (IoT), such as lamps, climate control, car components, household components, appliances, etc. may also be included in this list.

Figure 4A:
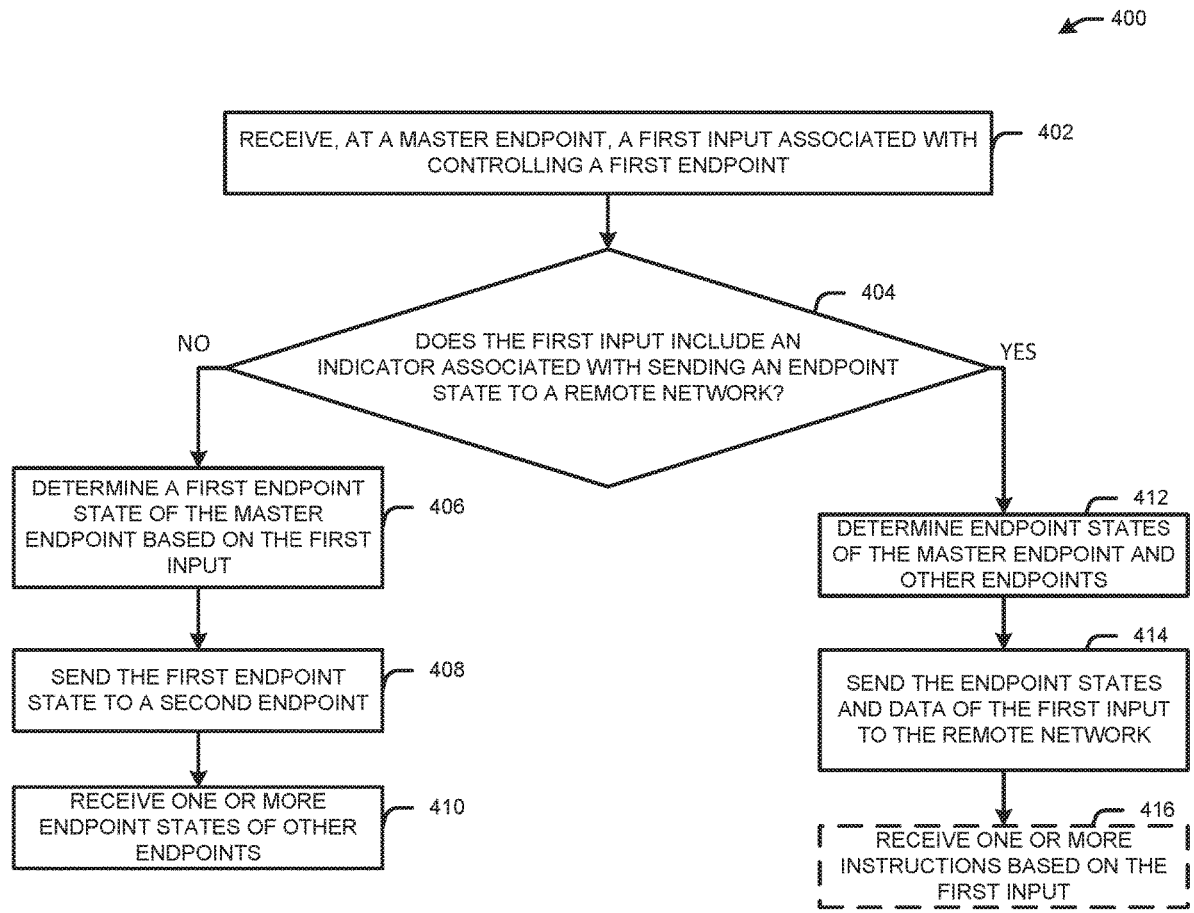
FIG. 4A illustrates a flow diagram for a process for locally grouping voice-enabled device state communications, in accordance with one or more example embodiments of the present disclosure.

FIG. 4A illustrates a flow diagram for a process 400 for locally grouping voice-enabled device state communications, in accordance with one or more example embodiments of the present disclosure.

At block 402, a master endpoint (e.g., the media device 104 of FIG. 1, a device of the media device system 106 of FIG. 1, the media device 114 of FIG. 1, the media device 208 of FIG. 2, the one or more media devices 302 of FIG. 3, the one or more IOT devices 315 of FIG. 3) may receive a first input associated with controlling a first endpoint (e.g., an endpoint of the master endpoint or an endpoint of another device). The first input may be received via voice command or other audible command (e.g., a sound from a device, a voice utterance, etc.), a button push, a touch input, a gesture, and the like, and may indicate a request to control the state of a device, such as to turn a device on or off, to select content to play, to control playback (e.g., pause, start, stop, rewind, fast forward, etc.), to scroll or otherwise navigate a menu, list, or other type of interface, and the like.

At block 404, the master device may determine whether the first input includes an indicator to send endpoint state information and/or related data (e.g., the voice data of FIG. 1, the data 314 of FIG. 3, the data 324 of FIG. 3) to a remote network (e.g., the one or more remote servers 116 of FIG. 1, the remote network 330 of FIG. 3). To reduce the number of transmissions of endpoint state information to the remote network, the communication of endpoint state information to the remote network may be limited to particular trigger actions (e.g., indicators that endpoint state information is to be sent to the remote network, such as the detection of a voice utterance, the passing of a time period, the type of input, etc.). For example, certain types of commands, such as voice commands, may be sent to the remote network for translation (e.g., to determine the intent of the voice command, and to determine instructions that result in commands which cause devices to perform actions based on the intent). When a voice command is received by the device, because the voice command may be sent to the remote network for translation, the device may send endpoint state information along with any data associated with the voice command (e.g., voice data representing the voice utterance of the voice command) to the remote network so that the remote network may analyze the endpoint state information when determining which device (e.g., the first device) is to receive instructions/commands in response to the voice command. Other types of inputs may trigger sending the endpoint state information along with command data to the remote network for analysis, such as inputs related to the selection of content to render, playback control actions (e.g., pause, play, stop, fast forward, rewind, skip back, etc.), menu display/navigation commands (e.g., scroll up, scroll down, scroll left, scroll right, etc.), and the like. When such an indicator is identified, the process 400 may continue at block 412. When such an indication is not identified, the process 400 may continue at block 406.

At block 406, the master device may determine a first endpoint state (e.g., endpoint state 1 of FIG. 1, endpoint state 202A of FIG. 2, the state information 328 of FIG. 3) based on the first input. The endpoint state may be for a physical or virtual endpoint of the master endpoint. For example, the master device may determine one or more actions associated with the first input, such as actions to turn on the master device or endpoint, to activate the device at another device (e.g., select an input at a television to receive and display data from the device), to present user interface data at the device, such as a list of presentable content (e.g., Video 1 and Video 2 of FIG. 1, Video 1-Video 4 of FIG. 2), and the like. When the device performs the actions based on the first input, the endpoint state of the device may change (e.g., from endpoint state 202A to endpoint state 202B of FIG. 2), and at block 408, the device may send the first endpoint state (e.g., endpoint state 1 of FIG. 1, endpoint state 202A or endpoint state 202B of FIG. 2, the state information 328 of FIG. 3) to a second device (e.g., the media device 104 of FIG. 1, a device of the media device system 106 of FIG. 1, the media device 114 of FIG. 1, the media device 208 of FIG. 2, the one or more media devices 302 of FIG. 3, the one or more IOT devices 315 of FIG. 3) in a local network, and/or to an endpoint in a remote network.

At block 410, the master device may receive one or more endpoint states (e.g., endpoint state 2 of FIG. 1, the state information 328 of FIG. 3) from other endpoints (e.g., endpoints of one or more other devices). At block 412, the master device may determine endpoint states (e.g., endpoint state 2 of FIG. 1, the state information 328 of FIG. 3) of devices/endpoints in a local network shared by the device and/or devices/endpoints in one or more remote networks, along with the endpoint states of the master device. The endpoint states may be received by the device from each of the devices when the device is a master endpoint. The endpoint state information of block 410 and block 412 may be indicative of endpoint states of the devices themselves (or the specific endpoints of the devices, including virtual endpoints), or may be indicative of the endpoint states of devices (e.g., the one or more IOT devices 315 of FIG. 3) controlled by the devices. For example, a smart home device (e.g., the one or more media devices 302 of FIG. 3) may control IOT devices (e.g., the one or more IOT devices 315 of FIG. 3), and the state information provided by the smart home device may include endpoint state information of the smart home device and/or endpoint state information of the IOT or other devices controlled by the smart home device.

At block 414, the master device may send the endpoint state information, including the endpoint state information of the master device and any other devices/endpoints, to a remote network (e.g., the one or more remote servers 116 of FIG. 1, the remote network 330 of FIG. 3), along with data (e.g., the voice data of FIG. 1, the data 314 of FIG. 3, the data 324 of FIG. 3) for translation and analysis. For example, the remote network may identify voice data, determine one or more instructions (e.g., the selection of Video 1 at step 142 of FIG. 1, the instructions 340 of FIG. 3, the instructions 342 of FIG. 3) corresponding to commands that, when executed, cause an endpoint to perform actions such as to turn on a device/endpoint, to activate the device/endpoint at another device (e.g., select an input at a television to receive and display data from the device), to present user interface data at the device, such as a list of presentable content (e.g., Video 1 and Video 2 of FIG. 1, Video 1-Video 4 of FIG. 2), and the like. The remote network may determine which device or endpoint corresponds to the data of the command based on the state information. For example, when the state information indicates that one device is off and another device is showing a menu, and the data of the command translates to a scrolling input, the device showing a menu may be the device to receive a command to scroll in a particular direction within the menu.

At block 416, the master device may receive one or more instructions from the remote network based on the first command when the instructions are intended to control the device, or when the device is a designated endpoint to receive the instructions and provide commands (e.g., the commands 326 of FIG. 3) to one or more other devices which are intended to be controlled by the instructions. The device may receive state information from one or more devices, such as from another device that received the instructions instead of the device (e.g., the instructions may be sent from the remote network to the device intended to execute the instructions, and that device may communicate its state information to the device after updating the state information based on the instructions). When the instructions indicate that a command was not understood, the device may prompt the user to repeat the command or provide another command.

Figure 4B:
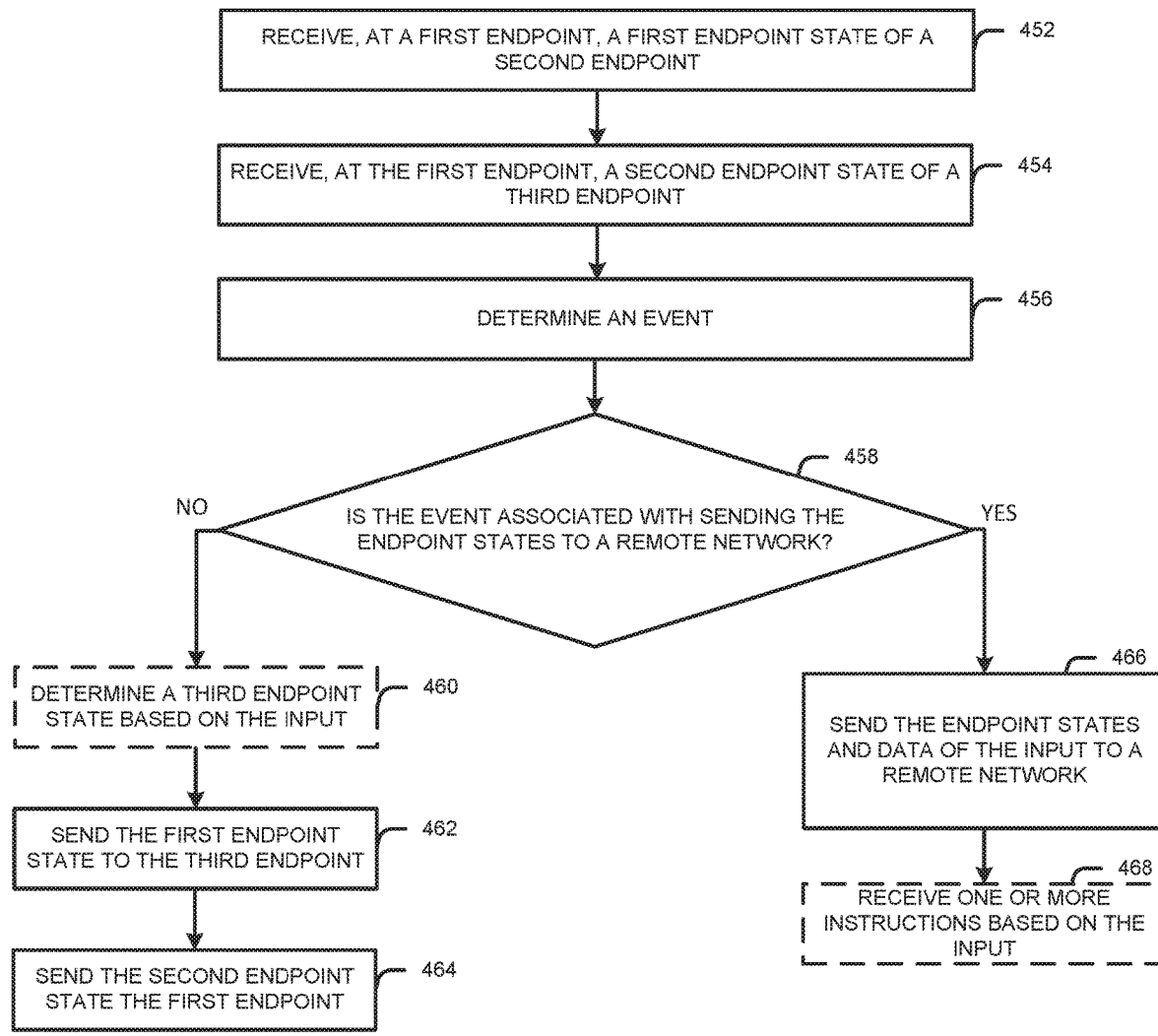
FIG. 4B illustrates a flow diagram for a process for locally grouping voice-enabled device state communications, in accordance with one or more example embodiments of the present disclosure.

FIG. 4B illustrates a flow diagram for a process 450 for locally grouping voice-enabled device state communications, in accordance with one or more example embodiments of the present disclosure.

At block 452, an endpoint (e.g., the media device 104 of FIG. 1, a device of the media device system 106 of FIG. 1, the media device 114 of FIG. 1, the media device 208 of FIG. 2, the one or more media devices 302 of FIG. 3, the one or more IOT devices 315 of FIG. 3) may receive an endpoint state (e.g., endpoint state 2 of FIG. 1, the state information 328 of FIG. 3) from a second endpoint. Either the endpoint or the first endpoint may be a master endpoint, or neither the endpoint nor the first endpoint may be a master endpoint. The endpoint and first endpoint may share a local or mesh network, or may be in remote networks.

At block 454, the endpoint may receive a second endpoint state (e.g., endpoint state 2 of FIG. 1, the state information 328 of FIG. 3) from a second endpoint. Either the endpoint or the second endpoint may be a master endpoint, or neither the endpoint nor the second endpoint may be a master endpoint. At block 452 and/or block 454, the endpoint state information may be sent based on a state change caused automatically or based on a manual change, such as a user input received by the first and/or second endpoints.

At block 456, the endpoint may determine an event. The event may be an input received by the endpoint, an indication of an input received by the first endpoint and/or the second endpoint, an indication of a state change caused by an automatic action of the endpoint, the first endpoint, and/or the second endpoint (e.g., a change in power status, the ending of content that was presented, a timed event, etc.). For example, the endpoint may receive an input associated with controlling a first endpoint (e.g., the endpoint or another endpoint). The input may be received via voice command or other audible command (e.g., a sound from a device, a voice utterance, etc.), a button push, a touch input, a gesture, and the like, and may indicate a request to control the state of a device, such as to turn a device on or off, to select content to play, to control playback (e.g., pause, start, stop, rewind, fast forward, etc.), to scroll or otherwise navigate a menu, list, or other type of interface, and the like.

At block 458, the device may determine whether the first event is associated with and/or includes an indicator to send the data related to the event (e.g., the voice data of FIG. 1, the data 314 of FIG. 3, the data 324 of FIG. 3) and/or the endpoint state data to a remote network (e.g., the one or more remote servers 116 of FIG. 1, the remote network 330 of FIG. 3). To reduce the number of transmissions of endpoint state information to the remote network, the communication of endpoint state information to the remote network may be limited to particular trigger actions (e.g., indicators that endpoint state information is to be sent to the remote network). For example, certain types of inputs, such as voice utterances, may be sent to the remote network for translation (e.g., to determine the intent of the voice utterance, and to determine instructions that result in commands which cause devices to perform actions based on the intent). When a voice input is received by the endpoint, because the voice input may be sent to the remote network for translation, the device may send endpoint state information along with any data associated with the voice input (e.g., voice data representing the voice utterance of the voice input) to the remote network so that the remote network may analyze the endpoint state information when determining which endpoint is to receive instructions in response to the voice input. Other types of inputs may trigger sending the endpoint state information along with input data to the remote network for analysis, such as inputs related to the selection of content to render, playback control actions (e.g., pause, play, stop, fast forward, rewind, skip back, etc.), menu display/ navigation commands (e.g., scroll up, scroll down, scroll left, scroll right, etc.), and the like. When such an indicator is identified, the process 450 may continue at block 466.

When such an indication is not identified, or the event represents a state change that occurs frequently and does not satisfy a criteria for triggering the providing of endpoint state information to a remote network, the process 450 may continue at block 460.

At block 460, the device may determine a third endpoint state (e.g., endpoint state 1 of FIG. 1, endpoint state 202A of FIG. 2, the state information 328 of FIG. 3) based on the input. For example, the endpoint may determine one or more actions associated with the input, such as actions to turn on/activate the endpoint, to present user interface data at or using the endpoint, such as a list of presentable content (e.g., Video 1 and Video 2 of FIG. 1, Video 1-Video 4 of FIG. 2), to select content to render, to set a temperature or time, and the like. When the endpoint performs the actions based on the input, the endpoint state of the endpoint may change (e.g., from endpoint state 202A to endpoint state 202B of FIG. 2), and at block 462, the endpoint may send the first endpoint state (e.g., endpoint state 1 of FIG. 1, device state 202A or endpoint state 202B of FIG. 2, the state information 328 of FIG. 3) and the third endpoint state to the third endpoint (e.g., the media device 104 of FIG. 1, a device of the media device system 106 of FIG. 1, the media device 114 of FIG. 1, the media device 208 of FIG. 2, the one or more media devices 302 of FIG. 3, the one or more IOT devices 315 of FIG. 3) in a local network or in a remote network.

At block 464, the endpoint may send the second endpoint state and the third endpoint state to the first endpoint. For example, the endpoint may be a master endpoint and may send its own endpoint state information along with endpoint state information of other endpoint in local network to other devices in the local network (or to one or more remote networks0 to inform the other endpoints of the endpoint state information of any endpoints in the local network and/or in a remote network.

At block 466, the endpoint may send the endpoint state information (e.g., the first endpoint state information, the second endpoint state information, and the third endpoint state information) to a remote network (e.g., the one or more remote servers 116 of FIG. 1, the remote network 330 of FIG. 3). The endpoint may send data associated with the input received, such as voice data, sound data, input data, or other data to the remote network for analysis. For example, the remote network may identify voice data, determine one or more instructions (e.g., the selection of Video 1 at step 142 of FIG. 1, the instructions 340 of FIG. 3, the instructions 342 of FIG. 3) corresponding to commands that, when executed, cause the endpoint or another endpoint to perform actions such as to turn on/activate the endpoint, to set an endpoint state, to scroll inputs or menu items, and the like. The remote network may determine which endpoint corresponds to the data of the input based on the endpoint state information. For example, when the endpoint state information indicates that one endpoint is off/inactive and another endpoint is showing a menu, and the data of the input translates to a scrolling input, the endpoint showing a menu may be the endpoint to receive a command/instruction to scroll in a particular direction within the menu.

At block 468, the endpoint may receive one or more instructions from the remote network based on the first input when the instructions are intended to control the endpoint, or when the endpoint is a designated endpoint to receive the instructions and provide commands (e.g., the commands 326 of FIG. 3) to one or more other endpoints which are intended to be controlled by the instructions. The endpoint may receive endpoint state information from one or more endpoints, such as from another endpoint that received the instructions instead of the endpoint (e.g., the instructions may be sent from the remote network to the endpoint intended to execute the instructions, and that endpoint may communicate its state information to the endpoint after updating the endpoint state information based on the instructions). When the instructions indicate that an input was not understood, the endpoint may prompt the user to repeat the input or provide another input.

Figure 5:
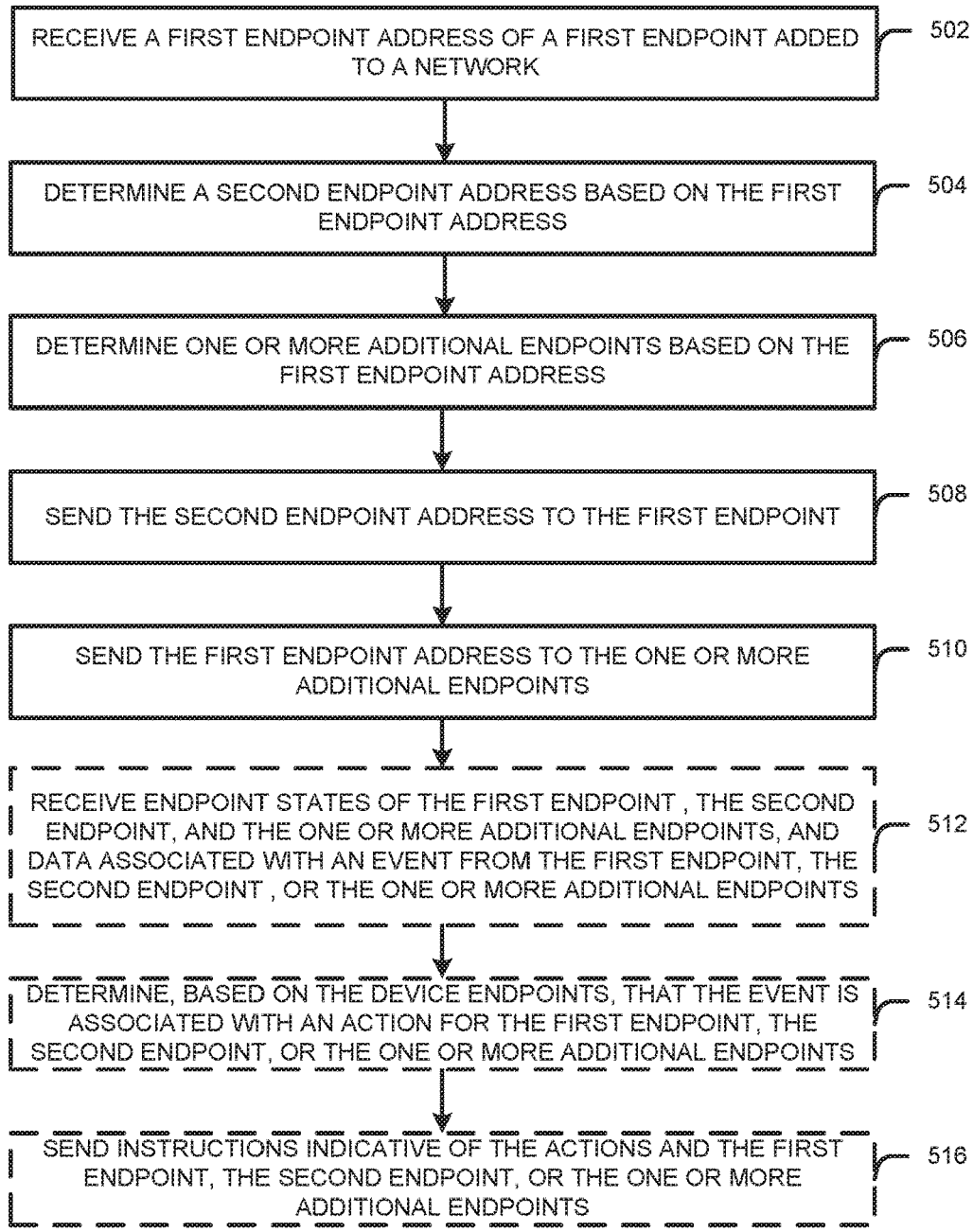
FIG. 5 illustrates a flow diagram for a process for locally grouping voice-enabled device state communications, in accordance with one or more example embodiments of the present disclosure.

FIG. 5 illustrates a flow diagram for a process 500 for locally grouping voice-enabled device state communications, in accordance with one or more example embodiments of the present disclosure.

At block 502, a system (e.g., the one or more remote servers 116 of FIG. 1, the remote network 330 of FIG. 3) may receive a first endpoint address of a first endpoint (e.g., the media device 104 of FIG. 1, a device of the media device system 106 of FIG. 1, the media device 114 of FIG. 1, the media device 208 of FIG. 2, the one or more media devices 302 of FIG. 3, the one or more IOT devices 315 of FIG. 3) when the endpoint is being added to a network. The first endpoint address may be an IP address, a URL, a medium access control address, or some other identifier of the first endpoint or device on which a virtual endpoint executes, the local network with which the first endpoint is associated, and/or an identifier of a user account or location. For example, the first endpoint may be an endpoint being initialized and added to a local area network, and may establish addresses to which to send state information and other data. A device may have multiple endpoints, such as multiple media rendering applications, so when a new endpoint is downloaded or otherwise added to a device, and when a user logs into and initiates the endpoint, the endpoint may need to establish information regarding when to provide certain information, such as state information, where to send the information, and how to send the information.

At block 504, the endpoint may determine a second endpoint address based on the first endpoint address. For example, the system may identify the URLs and/or MAC addresses of other endpoint using an IP address, and/or of other endpoints in other networks with which the endpoint may communicate. The second endpoint address may represent any endpoint to which the first endpoint may communicate state information, such as a master endpoint. At block 506, the system may determine one or more additional endpoint (e.g., endpoints) that are master endpoints, and that are not master endpoints, and may identify the respective addresses of master endpoints and/or non-master endpoints (e.g., endpoint receivers). The endpoints determined at block 506 may use a same local network as determined by an IP address or another device address, and/or may include endpoints in one or more remote networks.

At block 508, the system may send the second endpoint address and any other addresses (e.g., endpoint URLs) to the first endpoint along with any indications that a particular endpoint is a master endpoint to which the first endpoint may send state information. The system may provide criteria to the first endpoint regarding when to send endpoint state data to the system along with command data (e.g., voice data from a voice utterance). In this manner, the first endpoint may communicate its state information with one or more endpoints in a shared local network and/or in one or more remote networks, and may receive state information of other endpoints in the local network and/or in one or more remote networks. The first endpoint may send state information to the system when the criteria is satisfied (e.g., when an input includes an indicator to send the state information to the system). At block 510, the system may send the first endpoint address to the additional endpoint of the first endpoint to allow the additional endpoints to use the first endpoint address to send state information to the first endpoint.

At block 512, the system may receive endpoint state information, including the state information of the first endpoint, the second endpoint, and/or the one or more additional endpoints of a shared local network and/or one or more remote networks, along with data associated with an event or input (e.g., the voice data of FIG. 1, the data 314 of FIG. 3, the data 324 of FIG. 3) for translation and analysis. At block 514, the system may determine, based on the state information of the endpoints, that the event or input is associated with an action for the first endpoint, the second endpoint, and/or the one or more additional endpoints to perform. For example, the system may identify voice data, determine one or more instructions (e.g., the selection of Video 1 at step 142 of FIG. 1, the instructions 340 of FIG. 3, the instructions 342 of FIG. 3) corresponding to commands that, when executed, cause the first endpoint, the second endpoint, and/or the one or more additional endpoints (e.g., the one or more media devices 302 of FIG. 3, the one or more IOT devices 315 of FIG. 3, the one or more virtual endpoints 113 of FIG. 1) to perform actions such as to turn on, to select or provide content, to scroll or navigate a menu or list, and the like. The system may determine which endpoint corresponds to the data of the event or input based on the state information. For example, when the state information indicates that one endpoint is off/inactive and another endpoint is showing a menu, and the data of the input translates to a scrolling input, the endpoint showing a menu may be the endpoint to receive an instruction to scroll in a particular direction within the menu.

At block 516, the system may send instructions (e.g., the instructions 340 and/or the instructions 342 of FIG. 3) to the first endpoint, the second endpoint, and/or the one or more additional endpoint. The system may send the instructions to the endpoint for which the instructions are intended (e.g., based on the state information), or may send the instructions to a designated endpoint, such as a master endpoint, which may provide commands (e.g., the commands 326 of FIG. 3) that, when executed by another endpoint, may cause performance of the actions intended by the command that was translated by the system.

The embodiments described above are examples and are not meant to be limiting.

Figure 6:
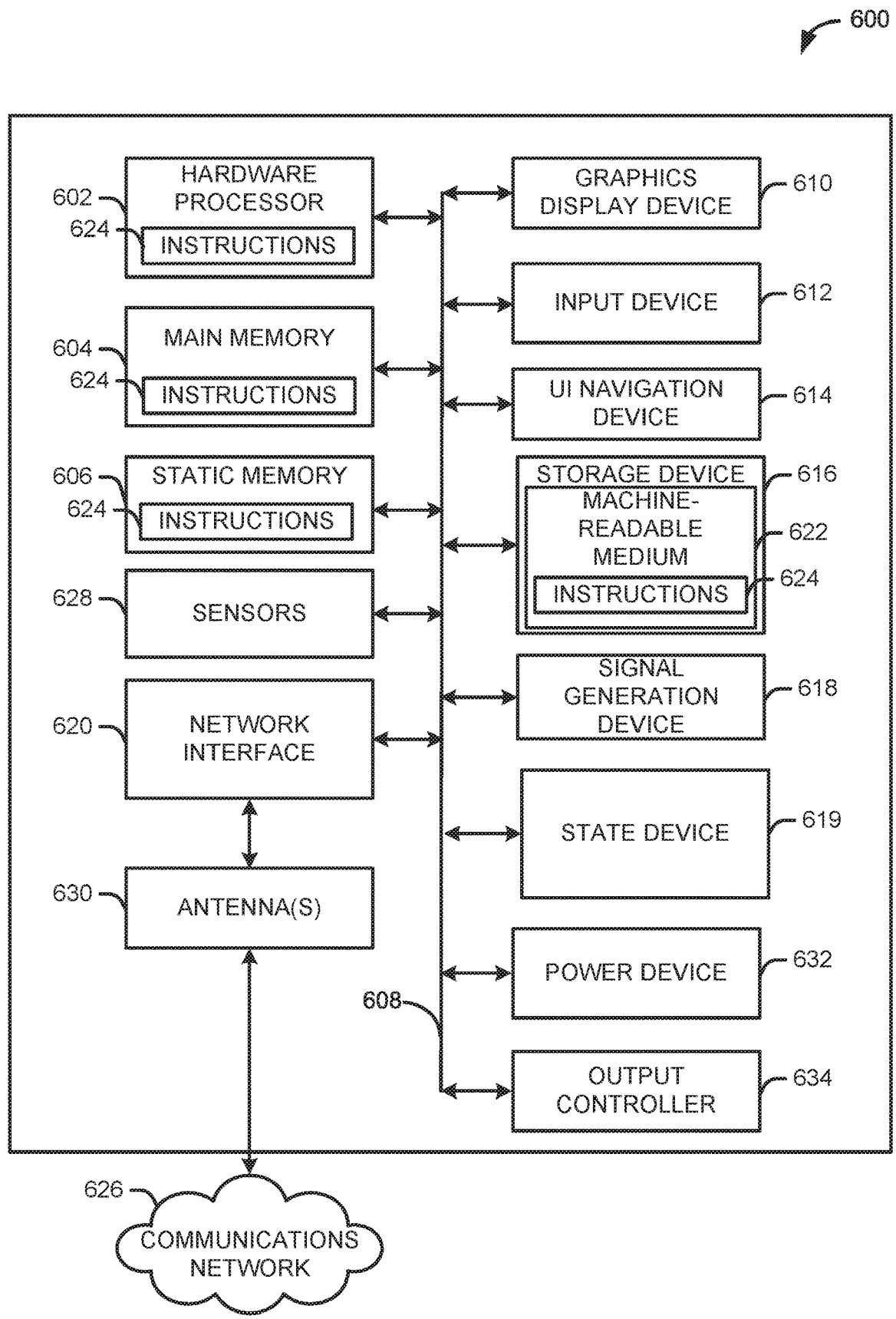
FIG. 6 illustrates a block diagram of an example machine upon which any of one or more techniques (e.g., methods) may be performed, in accordance with one or more example embodiments of the present disclosure.

FIG. 6 illustrates a block diagram of an example of a machine 600 (e.g., the media device 104 of FIG. 1, any device of the media device system 106 of FIG. 1, the media device 114 of FIG. 1, the one or more remote servers 116 of FIG. 1, the remote control device 206 of FIG. 2, the media device 208 of FIG. 2, the one or more media devices 302 of FIG. 3, the one or more IOT devices 315 of FIG. 3, the remote network 330 of FIG. 3) or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in Wi-Fi direct, peer-to-peer (P2P), cellular, (or other distributed) network environments. The machine 600 may be a server, a personal computer (PC), a smart home device, a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard, touch pad, buttons), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618 (e.g., when implemented as a remote control device, the signal generation device 618 may generate infrared command signals with command codes that cause media devices to perform actions, such as change endpoint states, select content to render, scroll a menu or list, etc.), a state device 619, a network interface device/transceiver 620 coupled to antenna(s) 630, and one or more sensors 628, such as a global positioning system (GPS) sensor, a compass, an accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a display, stereo receiver, media device, etc.)).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

The state device 619 may carry out or perform any of the operations and processes (e.g., process 400 of FIG. 4A, process 450 of FIG. 4B, process 500 of FIG. 5) described and shown above.

In one or more embodiments, the state device 619 may be implemented as part of a remote network (e.g., the one or more remote servers 116 of FIG. 1, the remote network 330 of FIG. 3). The state device 619 may coordinate by sharing endpoint state information locally (e.g., with media devices connected to a local area network in a home, office, building, etc.). By designating one or more multiple media devices as a "main device" or "reporter device," for example, the state device 619 may provide endpoint state information to a main device or reporter device, which may aggregate endpoint state information from multiple devices, including the main device or reporter device, and may provide the aggregated endpoint state information of multiple devices to the multiple devices so that the multiple devices may be aware of the endpoint state information of other media devices. By maintaining endpoint state information locally among multiple endpoints rather than each endpoint providing its respective endpoint state information to a remote network, the number of transmissions from a local network to a remote network, and the number of endpoint state updates provided to the remote network, may be reduced.

In one or more embodiments, to reduce the number of transmissions of endpoint state information to a remote network (e.g., the remote network 330 of FIG. 3), the communication of endpoint state information to the remote network may be limited to particular trigger actions (e.g., indicators that endpoint state information is to be sent to the remote network). For example, certain types of inputs, such as voice commands, may be sent to the remote network for translation (e.g., to determine the intent of the voice command, and to determine instructions that result in commands which cause endpoints to perform actions based on the intent). When a voice utterance is received by the state device 619, because the voice utterance may be sent to the remote network for translation, the state device 619 may send endpoint state information along with any data associated with the voice utterance (e.g., voice data representing the voice utterance) to the remote network so that the remote network may analyze the endpoint state information when determining which endpoint is to receive commands in response to the voice command. Other types of events or inputs may trigger sending the endpoint state information along with command data to the remote network for analysis, such as inputs related to the selection of content to render, playback control actions (e.g., pause, play, stop, fast forward, rewind, skip back, etc.), menu display/navigation inputs (e.g., scroll up, scroll down, scroll left, scroll right, etc.), and the like. When such an input is identified, the state device 619 may provide endpoint state information to the remote network. When events or inputs which do not trigger sending endpoint state information to the remote network are identified (e.g., when an indicator to send endpoint state information to the remote network are absent in a command), the state device 619 may process the event or input and send updated state information to one or more endpoints without sending the endpoint state information to a designated endpoint in the remote network.

In one or more embodiments, the state device 619 may serve as a master endpoint or endpoint reporter, which may determine when an endpoint state has changed at the master endpoint or at another endpoint (e.g., an endpoint receiver) as the endpoint receivers may provide their state information to the master endpoint. When an endpoint state has changed, or after a time threshold has been exceeded, the state device 619 may provide a context report to the endpoint receivers. The context report may include endpoint state information of the endpoint receivers and master endpoints in the local network. When an event or input is detected or received and includes an indicator that endpoint state information may be sent to a remote network, the endpoint which receives the input or detects the event may provide the endpoint state information along with data of the event or command to the remote network.

In one or more embodiments, the state device 619 may be implemented by a remote network (e.g., the remote network 330 of FIG. 3). When the state device 619 determines that an input is intended to control the endpoint which provided the media device state information, the state device 619 may send instructions to that endpoint or to a master endpoint to instruct the relevant endpoint. When the state device 619 determines that an input is intended to control a different endpoint than the endpoint which provided the endpoint state information, the state device 619 may send instructions to the different endpoint that is to be controlled by the input, or may send instructions to a designated endpoint (e.g., a master endpoint) to provide commands to the relevant endpoint.

In one or more embodiments, a trigger to cause an endpoint to send endpoint state information to a remote network may include a voice utterance (e.g., a wake word and/or string of audio), a geo-location (e.g., a command determined to be from within a distance threshold of a device, based on voice intensity, for example), an audible command such as a doorbell, a wireless signal from a smart home or Internet of things (IOT) device, and the like. For example, a smart home device may control an IOT device network, such as a network of temperature controllers, lightbulbs, doorbell cameras, microwaves, refrigerators, and the like. The smart home device may maintain device state information such as whether lights are on or off, at what power/intensity level, a temperature of a thermostat, microwave, or refrigerator, a security alarm status (e.g., active, not active, etc.), and the like. An endpoint may receive device state information from a smart home device, and the smart home device may be an endpoint capable of communicating with a remote network. Media device state information of IOT and other devices may be used to translate commands, such as "Turn on the lights," "Set the temperature to 68 degrees," and the like. The state device 619 may send and/or receive state information for IOT devices.

It is understood that the above are only a subset of what the state device 619 may be configured to perform and that other functions included throughout this disclosure may also be performed by the state device 619.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method, comprising:
    determining, by a first endpoint associated to a local network of an access point, first state information associated with the first endpoint;
    sending, by the first endpoint, the first state information to a second endpoint associated to the local network;
    receiving, at the first endpoint, second state information associated with the second endpoint;
    receiving, at the first endpoint, third state information associated with a third endpoint associated to the local network;
    detecting, by the first endpoint, a first event occurring at the first endpoint, the second endpoint, or the third endpoint, wherein the first event is associated with an indication to send the first state information, the second state information, and the third state information to a network remote from the local network;
    detecting, by the first endpoint, a second event occurring at the first endpoint, the second endpoint, or the third endpoint, wherein the second event is unassociated with the indication;
    sending, by the first endpoint, to the network remote from the local network, based on the first event being associated with the indication, the first state information, the second state information, the third state information, and data associated with the first event;
    receiving, at the first endpoint, fourth state information associated with the first event; and
    refrain from sending, by the first endpoint, to the network remote from the local network, based on the second event being unassociated with the indication, data associated with the second event, and fifth state information associated with the first endpoint, the second endpoint, or the third endpoint.

2. The method of claim 1, wherein the fourth state information is received from the second endpoint and is associated with the third endpoint.

3. The method of claim 1 further comprising sending the fourth state information to the second endpoint, wherein the fourth state information is received from the third endpoint.

4. The method of claim 1, wherein the indication comprises a voice utterance, further comprising:
    determining an absence of a voice utterance associated with the second event.

5. The method of claim 4, wherein the indication comprises a voice utterance, wherein sending the first state information, the second state information, the third state information, and data associated with the first event comprises sending the first state information, the second state information, the third state information, and voice data associated with the voice utterance to the network remote from the local network.

6. The method of claim 1, further comprising sending the first state information and the second state information to the third endpoint.

7. The method of claim 1, wherein the indication comprises a voice utterance, wherein the data associated with the first event comprises voice data based on the voice utterance, and wherein sending comprises recognizing the voice data.

8. The method of claim 1, further comprising determining that the first event is associated with a selection of content to render, and wherein the fourth state information is associated with rendering the content.

9. The method of claim 1, further comprising determining that the first event is associated with a playback control, and wherein the fourth state information is associated with the playback control.

10. The method of claim 1, further comprising determining that the first event is associated with a scrolling input, and wherein the fourth state information is associated with the scrolling input.

11. The method of claim 1, further comprising:
sending a first endpoint address associated with the first endpoint; and
receiving, at the first endpoint, an instruction to send endpoint states to the second endpoint, wherein sending the first state information to the second endpoint is based on the instruction.

12. The method of claim 11, wherein the first endpoint address comprises an Internet protocol (IP) address associated with the first endpoint, the second endpoint, and the third endpoint.

13. The method of claim 11, wherein the instruction comprises a second endpoint address associated with the second endpoint.

14. A device comprising memory coupled to at least one processor, the at least one processor configured to:
determine first state information associated with the device, wherein the device is associated to a local network of an access point;
send the first state information to a second device associated to the local network;
receive second state information associated with the second device;
receive third state information associated with a third device and an Internet of things (IOT) device, the third device and the IOT device associated to the local network;
detect a first event occurring at the IOT device, wherein the first event is associated with an indication to send the first state information, the second state information, and the third state information to a network remote from the local network;
detect a second event occurring at the device, the second device, the third device, or the IOT device, wherein the second event is unassociated with the indication;
send, to the network remote from the local network, based on the first event being associated with the indication, the first state information, the second state information, the third state information, and data associated with the first event;
receive an instruction associated with the IOT device;
send the instruction to the third device;
receive fourth state information associated with the third device, the IOT device, and the first event; and
refrain from sending, to the network remote from the local network, based on the second event being unassociated with the indication, data associated with the second event, and fifth state information associated with the device, the second device, or the third device.

15. The device of claim 14, wherein the fourth state information is received from the second device.

16. The device of claim 14, wherein the at least one processor is further configured to send the fourth state information to the second device, and wherein the fourth state information is received from the third device.

17. A system, comprising at least one processor of a first endpoint associated to a local network of an access point, the at least one processor coupled to memory, the at least one processor configured to:
determine first state information associated with the first endpoint;
send the first state information to a second endpoint associated to the local network;
receive second state information associated with a second endpoint;
receive third state information associated with a third endpoint associated to the local network;
detect a first event occurring at the first endpoint, the second endpoint, or the third endpoint, wherein the first event is associated with an indication to send the first state information, the second state information, and the third state information to a network remote from the local network;
detect a second event occurring at the first endpoint, the second endpoint, or the third endpoint, wherein the second event is unassociated with the indication;
send, to the network remote from the local network, based on the first event being associated with the indication, the first state information, the second state information, the third state information, and data associated with the first event;
receive fourth state information associated with the first event; and
refrain from sending, to the network remote from the local network, based on the second event being unassociated with the indication, data associated with the second event, and fifth state information associated with the first endpoint, the second endpoint, or the third endpoint.

18. The system of claim 17, further comprising a first device and a second device, wherein the first endpoint is associated with the first device, wherein the first device is a voice-enabled device, and wherein the second endpoint is a virtual endpoint associated with the second device.

19. The system of claim 17, wherein the first state information is indicative of first content presented using the first endpoint, wherein the second state information is indicative of a power state of the second endpoint, and wherein the third state information is indicative of second content presented using the third endpoint.

20. The system of claim 17, wherein the at least one processor is further configured to:
receive voice data indicative of a user request,
wherein to detect the first event is based on receiving the voice data, and wherein to send the data associated with the first event comprises to send the voice data.

* * * * *

UNITED STATES PATENT AND TRADEMARK OFFICE
CERTIFICATE OF CORRECTION

| | |
|---|---|
| PATENT NO. | : 11,429,344 B1 |
| APPLICATION NO. | : 16/586435 |
| DATED | : August 30, 2022 |
| INVENTOR(S) | : Tomas Manuel Fernandez, Mark Lawrence and Charles James Torbert |

Page 1 of 1

It is certified that error appears in the above-identified patent and that said Letters Patent is hereby corrected as shown below:

On the Title Page

(72) Name of inventor: "Tomas Manuel Fernandez, Eagan, MN (US); Mark Lawrence, Bainbridge Island, WA (US); Charles James Torbert, Normandy Park, WA (US)" should read -- Tomas Manuel Fernandez, Normandy Park, WA (US); Mark Lawrence, Bainbridge Island, WA (US); Charles James Torbert, Eagan, MN (US) --.

Signed and Sealed this
Third Day of October, 2023

Katherine Kelly Vidal
*Director of the United States Patent and Trademark Office*